Patented Sept. 28, 1948

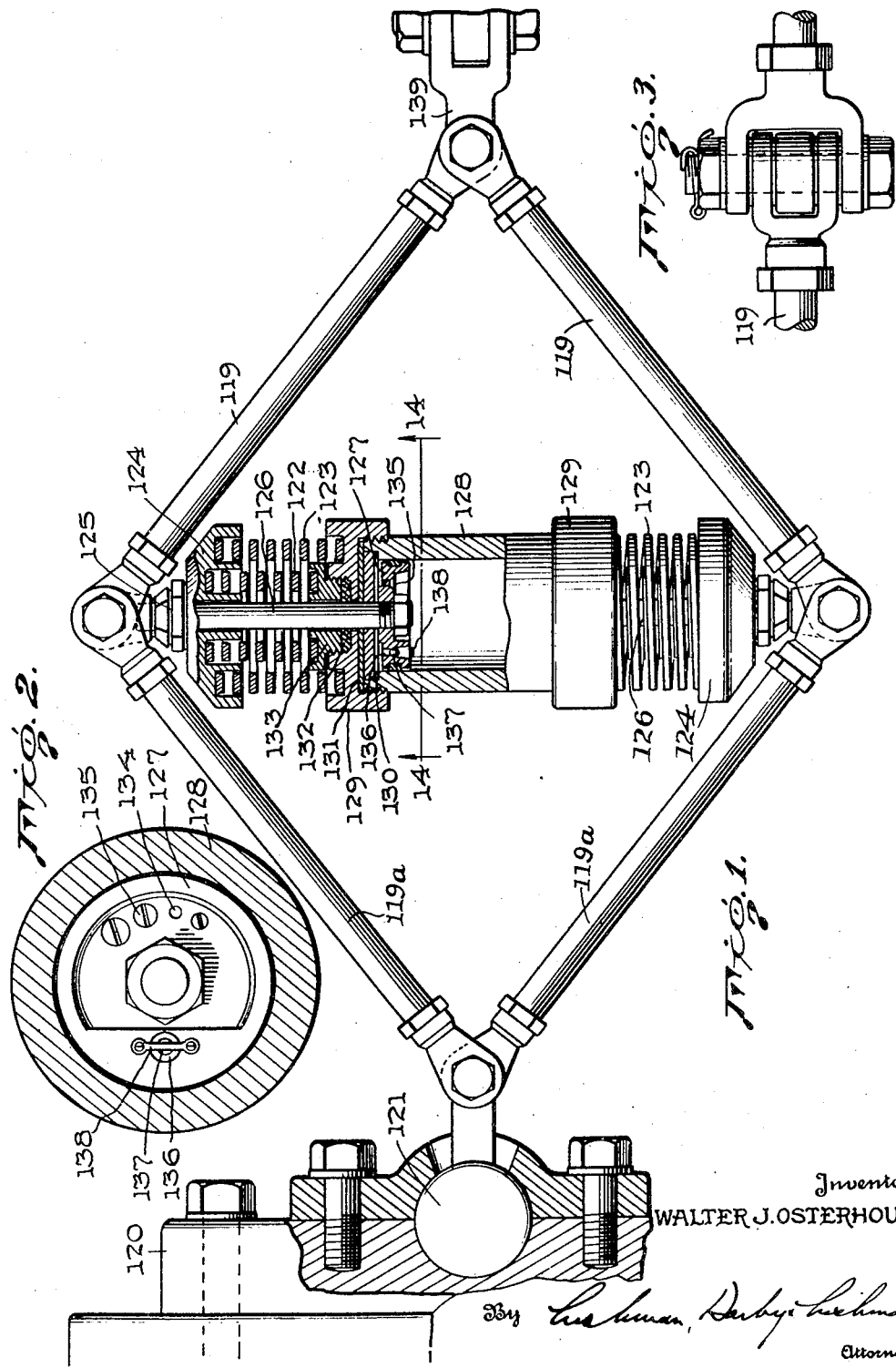

2,450,154

UNITED STATES PATENT OFFICE 2,450,154

SHOCK ABSORBER

Walter J. Osterhoudt, Houston, Tex.

Original application November 17, 1942, Serial No. 465,892, now Patent No. 2,377,442, dated June 5, 1945. Divided and this application March 28, 1945, Serial No. 585,272

7 Claims. (Cl. 267—1)

The present application is a division of my copending application, Serial No. 465,892, filed November 17, 1942, now Patent No. 2,377,442, dated June 5, 1945.

The invention of the present application relates to a new and improved tension shock absorber, adapted for use with cables and other tension devices, to absorb shocks therein. Although the invention is well adapted for use with submarine vessels of the type shown in my parent patent, referred to above, it is in no sense limited thereto, as it may be used in many other combinations, such as with diving and salvaging equipment, cranes, derricks, towing lines and various other types of tension cables.

A primary object of the invention is to provide a tension shock absorber which is internally balanced and self-adjusting throughout a wide range of variations in static tension, yet which will invariably function to cushion and absorb sudden increases in tension applied to the line.

A further object of the invention is to provide, in a tension shock absorber, means for quickly restoring the shock absorbing devices to their original condition and positions, when an abnormal shock or load condition has been terminated.

A further object of the invention is to provide a shock absorber which can be readily shifted in its position, so that, if the direction of pull changes, the shock absorber is directly in line between the source and the support to which it is affixed.

Still another object is to provide simple means for adjusting the shock absorber to accommodate a wide variation in the degrees of shock to be most effectively absorbed.

A still further object of the invention is to provide a shock absorber designed for use with towing cables or the like, adapted to relieve such a cable of suddenly increased stresses and strains imposed upon it when towing a vessel of any kind, such as a submarine vessel of the type described in my parent patent identified above.

Other and further objects and advantages of the invention will be apparent from the following description of a specific embodiment of the invention shown in the accompanying drawings, in which:

Figure 1 is a plan view, partly in section, of a shock absorber, showing its attachment to a davit or other substantially fixed support, and its attachment to a line-holding clevis or the like;

Figure 2 is a sectional view along line 14—14 of Figure 1 and

Figure 3 is a detail view of the pivotal interconnection between the arms or toggle links of the shock absorber.

The cable shock absorber shown in Figures 1 to 3 inclusive comprises a pair of interconnected toggles 119, 119a, one of which is secured at its fulcrum to some support such as a davit 120 by a ball and socket connection 121, so formed as to permit the assembly to pivot freely in all directions, and the other of which is connected at its fulcrum by a clevis 139 to a drawbar, sheave or other tension producing device.

The remote ends of the links of the toggles are pivotally interconnected by pin-and-clevis connections shown in detail in Figure 3 and are held separated or extended by concentric pairs of springs 122 and 123, the springs of each pair being right and left hand wound, respectively, to reduce any tendency to twist the assembly. The outer ends of these springs seat in annular grooves of caps 124 which abut shoulders 125 on piston rods 126. Each rod 126 carries a piston 127 reciprocable toward and from the other piston in a floating cylinder 128, the ends of which are closed by screw threaded heads 129, which compress copper gaskets 130 against an internal shoulder in the wall of the cylinder adjacent the end. A rubber or neoprene packing 131 seals the cylinder at each end with the assistance of packing 132. The gland nut 133 at each end, which retains the packing is formed with an annular groove in which the coil spring 122 is seated.

The cylinder 128 contains air, gas, mixtures of air or gas and suitable liquids, or oil of selected viscosity which, in travel of the respective pistons toward each other, pass through a dashpot opening 134 in each piston to check its movement and to supplement the retarding action of the springs 122 and 123. A series of such ports 134 of graduated size may be suitably provided in each piston and all but the one in each which is of a size for most efficient action with the dashpot fluid used and the load applied are then plugged as by screws 135.

For free retraction of the pistons when load tending to compress or collapse the toggles is relieved, each piston has another port 136 in which a ball check valve 137 is retained by a cage 138. The port 136 flares outwardly toward the face of the piston whereby, as the pistons approach each other when the toggles are collapsed inwardly in lateral direction, the ball valve 137 closes the port 136 and all fluid passing the piston is required to flow through the dashpot passage 134. Upon retraction of the piston when the load is released and the toggles resume their normal, extended position, the pistons are retracted and the respective ball valves 137 open to permit the free passage of the fluid into the space therebetween.

The fulcrum of the toggle 119a is connected for angular movement and rotation, as previously described, by means of a ball and socket joint, while the fulcrum of the other is connected by clevis 139 to a drawbar, sheave or other means to which a load is applied.

As stated above, the floating cylinder 128 may be filled with air, gas, or a mixture of air or gas with a suitable liquid. In compression, the gas or air will cushion the initial shock and will quickly pass through the dashpot orifice in each piston, whereas the viscous and slowly acting liquid will be trapped between the two piston faces and will pass through the orifices more slowly. The term "fluid" used in the claims is to be understood as having its broadest meaning, covering a gas, a liquid or mixtures of the two.

By the selection of the proper strength of springs and by suitable size and weight of material, the shock absorber of the present invention has a wide range of applications. A small, weak-springed, light weight, air or gas filled shock absorber will reduce acceleration shocks ranging from a few ounces to several pounds, while a large, heavy spring, heavy duty, oil filled shock absorber, will reduce acceleration shocks ranging from several hundred pounds to many tons.

It must be understood that the invention is not limited to the details of construction shown in the accompanying drawings and described above, but includes all modifications coming within the scope of the appended claims and their equivalents.

I claim:

1. A tension shock absorber adapted to be interposed between a substantially fixed support and a source of tension such as a line, cable or the like, comprising two pairs of toggle links having their remote ends pivotally interconnected, means for connecting the fulcrum of one pair of links to the source of tension, a swivel for operatively connecting the other fulcrum to the support, and means interposed between the interconnected ends of the toggle links to resist lateral collapse of the toggles under tension, said means comprising a floating cylinder, a pair of pistons therein, each having an orifice therein, piston rods associated with the pistons, each operatively connected to the adjacent interconnected ends of the toggle links, coil compression springs between the ends of the cylinder and the adjacent interconnected ends of the toggle, and a body of fluid in the cylinder.

2. A tension shock absorber adapted to be interposed between a substantially fixed support and a source of tension such as a line, cable or the like, comprising two pairs of toggle links having their remote ends pivotally interconnected, means for connecting the fulcrum of one pair of links to the source of tension, a swivel for operatively connecting the other fulcrum to the support, and means interposed between the interconnected ends of the toggle links to resist lateral collapse of the toggles under tension, said means comprising a floating cylinder, a pair of pistons therein, each having an orifice therein, piston rods associated with the pistons, each operatively connected to the adjacent interconnected ends of the toggle links, coil compression springs between the ends of the cylinder and the adjacent interconnected ends of the toggle, a body of fluid in the cylinder, and a valve controlled opening in each piston, permitting substantially free flow of fluid therethrough in the direction of movement as influenced by said springs.

3. A tension shock absorber adapted to be interposed between a substantially fixed support and a source of tension such as a line, cable or the like, comprising two pairs of toggle links having their remote ends pivotally interconnected, means for connecting the fulcrum of one pair of links to the source of tension, a swivel for operatively connecting the other fulcrum to the support, and means interposed between the interconnected ends of the toggle links to resist lateral collapse of the toggles under tension, said means comprising a floating cylinder, a pair of pistons therein, each having an orifice therein, piston rods associated with the pistons, each operatively connected to the adjacent interconnected ends of the toggle links, a pair of concentric coil compression springs interposed between each end of the cylinder and the adjacent interconnected ends of the toggles, urging the toggles to expanded position, the springs of each pair being, respectively reversely coiled, and a body of fluid in the cylinder.

4. A tension shock absorber adapted to be interposed between a substantially fixed support and a source of tension such as a line, cable or the like, comprising two pairs of toggle links having their remote ends pivotally interconnected, means for connecting the fulcrum of one pair of links to the source of tension, a swivel for operatively connecting the other fulcrum to the support, and means interposed between the interconnected ends of the toggle links to resist lateral collapse of the toggles under tension, said means comprising a floating cylinder, a pair of pistons therein, piston rods associated with the pistons, each operatively connected to the adjacent interconnected ends of the toggle links, a pair of concentric coil compression springs interposed between each end of the cylinder and the adjacent interconnected ends of the toggles, urging the toggles to expanded position, the springs of each pair being, respectively, reversely coiled, a body of fluid in the cylinder and a plurality of dash-pot orifices in the pistons of progressively differing sizes, selectively plugged, to vary the shock absorbing characteristics of the shock absorber.

5. A tension shock absorber adapted to be interposed between a support and a source of tension, such as a cable, tension line or the like, comprising two pairs of toggle links having their remote ends pivotally interconnected and providing a collapsible parallelogram structure, means for connecting the fulcrum of one toggle to the source of tension, means for pivotally connecting the fulcrum of the other toggle to the support, and means interposed between the interconnected ends of the toggle links for resisting inward collapse thereof, the last mentioned means comprising inwardly extending piston rods having their outer ends pivotally connected to the interconnected ends of the links, ported pistons on the rods, a free floating cylinder enclosing the pistons and having heads through which the piston rods extend, a spring seat cap carried by each rod in spaced relation to and facing the adjacent cylinder head, and a spring interposed between each head and the adjacent cap.

6. A tension shock absorber adapted to be interposed between a support and a source of tension, such as a cable, tension line or the like, comprising two pairs of toggle links having their remote ends pivotally interconected and providing a collapsible parallelogram structure, means for connecting the fulcrum of one toggle to the source of tension, means for pivotally connecting the fulcrum of the other toggle to the support, and means interposed between the interconnected ends of the toggle links for resisting inward collapse thereof, the last mentioned means comprising inwardly extending piston rods having their outer ends pivotally connected to the interconnected ends of the links, ported pistons on the rods, a free floating cylinder enclosing the pistons and having heads through which the piston rods extend, a spring seat cap carried by each rod in spaced relation to and facing the adjacent cylinder head, and a pair of concentric, reversely wound coil compression springs interposed between each head and the adjacent cap.

7. A tension shock absorber adapted to be interposed in a tension line, comprising two pairs of toggles having their remote ends pivotally interconnected and their fulcrums in the line of tension, a pair of inwardly extending rods pivotally connected at their outer ends to the points of interconnections of the toggles, a piston on the inner end of each rod, a single cylinder enclosing the pistons and having heads slidably embracing the rods, spring seat caps carried by the rods adjacent their outer ends, a pair of concentric, coil compression springs of respectively oppositely wound hand interposed between each cylinder head and the adjacent cap, urging the toggles to extended position, and a body of fluid in the cylinder, said pistons each having an unobstructed orifice of restricted size therein and a valved orifice, retarding inward movement of the pistons when the tension on the lines is suddenly increased, but facilitating outward return thereof under the influence of said springs when the tension is reduced.

WALTER J. OSTERHOUDT.

REFERENCES CITED

The following references are of record in the file of this patent:

UNITED STATES PATENTS

| Number | Name | Date |
|---|---|---|
| 178,644 | Kelley | June 13, 1876 |
| 993,394 | Munn | May 30, 1911 |
| 1,103,084 | Ruff | July 14, 1914 |
| 1,298,243 | Miller | Mar. 25, 1919 |
| 1,631,569 | Aldrin | June 7, 1927 |
| 1,802,411 | Dorner et al. | Apr. 13, 1931 |

FOREIGN PATENTS

| Number | Country | Date |
|---|---|---|
| 193,767 | Great Britain | Mar. 1, 1923 |
| 438,492 | Great Britain | Nov. 18, 1935 |
| 452,217 | France | Mar. 3, 1913 |
| 496,059 | Great Britain | Nov. 24, 1938 |
| 577,370 | France | June 4, 1924 |